(12) United States Patent
Washio

(10) Patent No.: US 7,287,157 B2
(45) Date of Patent: Oct. 23, 2007

(54) DIGITAL CONTENT SYSTEM

(75) Inventor: Kazuto Washio, Asaka (JP)

(73) Assignee: Fujifilm Corporation, Tokyo (JP)

( * ) Notice: Subject to any disclaimer, the term of this patent is extended or adjusted under 35 U.S.C. 154(b) by 818 days.

(21) Appl. No.: 10/411,096

(22) Filed: Apr. 11, 2003

(65) Prior Publication Data
US 2003/0200432 A1    Oct. 23, 2003

(30) Foreign Application Priority Data
Apr. 18, 2002 (JP) .............................. 2002-115575

(51) Int. Cl.
*H04L 9/10* (2006.01)
(52) U.S. Cl. .................. 713/155; 713/160; 713/162; 713/168; 713/189; 726/2; 726/11; 380/229; 380/232; 380/247; 705/51; 709/225; 709/226; 709/229
(58) Field of Classification Search ................ 713/168, 713/193, 176, 155, 160, 162, 189; 726/2, 726/11; 705/50, 51; 380/229, 232, 247; 709/225–226, 229
See application file for complete search history.

(56) References Cited
U.S. PATENT DOCUMENTS
6,973,671 B1 * 12/2005 Hsing et al. ................... 726/8

2002/0023143 A1 * 2/2002 Stephenson et al. ........ 709/218
2003/0115142 A1 * 6/2003 Brickell et al. ............... 705/51

* cited by examiner

*Primary Examiner*—Kim Vu
*Assistant Examiner*—Baotran N. To
(74) *Attorney, Agent, or Firm*—Birch, Stewart, Kolasch & Birch, LLP

(57) ABSTRACT

A specific client computer acquires content that has been stored in a content server. To accomplish this, the ID of the client computer is registered with the content server. The IP address, etc., of the content server is encrypted to obtain a check code and the check code is transmitted to the client computer and to a center server. The check code, etc., is transmitted from the client computer to the center server. The center server decrypts the check code transmitted from the client computer and the check code transmitted from the content server. The IP address, etc., of the content server is obtained by the decryption. If the IP address, etc., obtained from the check code transmitted from the client computer and the IP address obtained from the check code transmitted from the content server agree, the center server decides that the client computer is an authorized computer and transmits the IP address of the content server to the client computer. The authorized client computer thus ascertains the IP address of the content server and can obtain content from the content server.

2 Claims, 5 Drawing Sheets

DIGITAL CONTENT SYSTEM

BACKGROUND OF THE INVENTION

1. Field of the Invention

This invention relates to a digital content system that includes a client computer, a content server with which the ID of this client computer is registered, and a center server.

2. Description of the Related Art

Since commands from client computers concentrate in the server in a client-server model, the load on the server is a heavy one. Peer-to-peer network systems currently are the object of much attention because of their ability to alleviate server load.

By utilizing a peer-to-peer network system, digital content that has been stored in a computer can be acquired directly by another computer. In a peer-to-peer network system according to the prior art, however, all users are capable of accessing computers that constitute the peer-to-peer network system. As a consequence, this system is not suited to a case where it is desired to disclose digital content to a specific user.

SUMMARY OF THE INVENTION

Accordingly, an object of the present invention is to disclose digital content to specific users.

A digital content system according to the present invention comprises a client computer, a content server with which an ID of the client computer is registered, and a center server.

The content server includes a first transmitting device (first transmitting means) for transmitting the ID of the client computer and encrypted address data indicating the address of the client computer to the center server [the ID may be encrypted, in which case the center server would be provided with a decrypting device (decrypting means) for decrypting the encrypted ID]; and a second transmitting device (second transmitting means) for transmitting the encrypted address data to the client computer.

The client computer includes a third transmitting device (third transmitting means) for transmitting the ID of the client computer and the encrypted address data, which has been transmitted from the second transmitting device of the content server, to the center server.

The center server includes a first decrypting device (first decrypting means) for decrypting the encrypted address data that has been transmitted from the first transmitting device of the content server; a second decrypting device (second decrypting means) for decrypting the address data that has been transmitted from the third transmitting device of the client computer; a first determination device (first determination means) for determining whether the address data that has been decrypted by the first decrypting device and the address data that has been decrypted by the second decrypting device agree; a second determination device (second determination means) for determining whether the ID of the client computer that has been transmitted from the first transmitting device of the content server and the ID of the client computer that has been transmitted from the third transmitting device of the client computer agree; and a fourth transmitting device for transmitting the address data that has been decrypted by at least one of the first and second decrypting devices to the client computer in response to a determination by both of the first and second determination devices that agreement has been obtained.

The client computer, content server and center server may each be constructed independently of one another.

Further, the invention may be adapted so as to provide methods of controlling the client computer, content server and center server.

Further, the invention may be adapted so as to provide a program for implementing the above control methods and a recording medium on which these programs have been stored.

In accordance with the present invention, the ID of the client computer and encrypted data indicating the address of the content server are sent from the content server to the center server. Further, the encrypted address data is also sent from the content server to the client computer. The ID of the client computer and the encrypted address data are sent from the client computer to the center server.

The center server decrypts the encrypted address data that has been transmitted from the first transmitting device of the content server and the encrypted address data that has been transmitted from the third transmitting device of the client computer. If the two items of decrypted address data agree, then the decrypted address data is transmitted from the center server to the client computer.

Since the client computer receives the address data of the content server, the user of the client computer can ascertain the address of the content server. Thus it becomes possible to access the content server and acquire digital content that has been stored in the content server.

A specific client computer can be notified of the address of the content server. As a result, digital content that has been stored in the content server can be provided to a specific user.

Whether or not a client computer has the right to access the content server is determined by both the ID of the client computer and the encrypted address data. Even if a third party that does not have the right knows the ID of the client computer, the third party cannot ascertain the address of the content server unless the third party acquires the encrypted address data. This means that a third party can be prevented from gaining unauthorized access to the content server.

The client computer further includes a fifth transmitting device (fifth transmitting means) for transmitting the ID of the client computer to the content server. In this case, the content server would further include a third determination device for determining whether the ID of the client computer transmitted from the fifth transmitting device of the client computer and the ID of the client computer registered agree, and a sixth transmitting device for transmitting digital content to the client computer in response to a determination by the third determination device that the two IDs agree.

Thus, authentication of the client computer is performed by the content server as well. This makes it possible to prevent unauthorized access.

A digital content system according to a second aspect of the present invention comprises a client computer, a content server with which an ID of the client computer is registered, and a center server.

The content server includes a first transmitting device (first transmitting means) for transmitting the ID of the client computer to the center server.

The client computer includes a second transmitting device (second transmitting means) for transmitting the ID of the client computer to the center server.

The center server includes a determination device (determination means) for determining whether the ID of the client computer that has been transmitted from the first transmitting device of the content server and the ID of the client computer that has been transmitted from the second transmitting device of the client computer agree; and a third transmitting device (third transmitting means) for transmitting data, which represents an address of the content server, to the client computer in response to a determination by the determination device that the two IDs agree.

In the second aspect of the present invention also, the client computer, content server and center server may each be constructed independently of one another.

Further, the second aspect of the invention may be adapted so as to provide methods of controlling the client computer, content server and center server.

Further, the second aspect of the invention may be adapted so as to provide a program for implementing the above control methods and a recording medium on which these programs have been stored.

The second aspect of the present invention also makes it possible to notify a specific client computer of the address of the content server.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the drawings.

Figure 1:
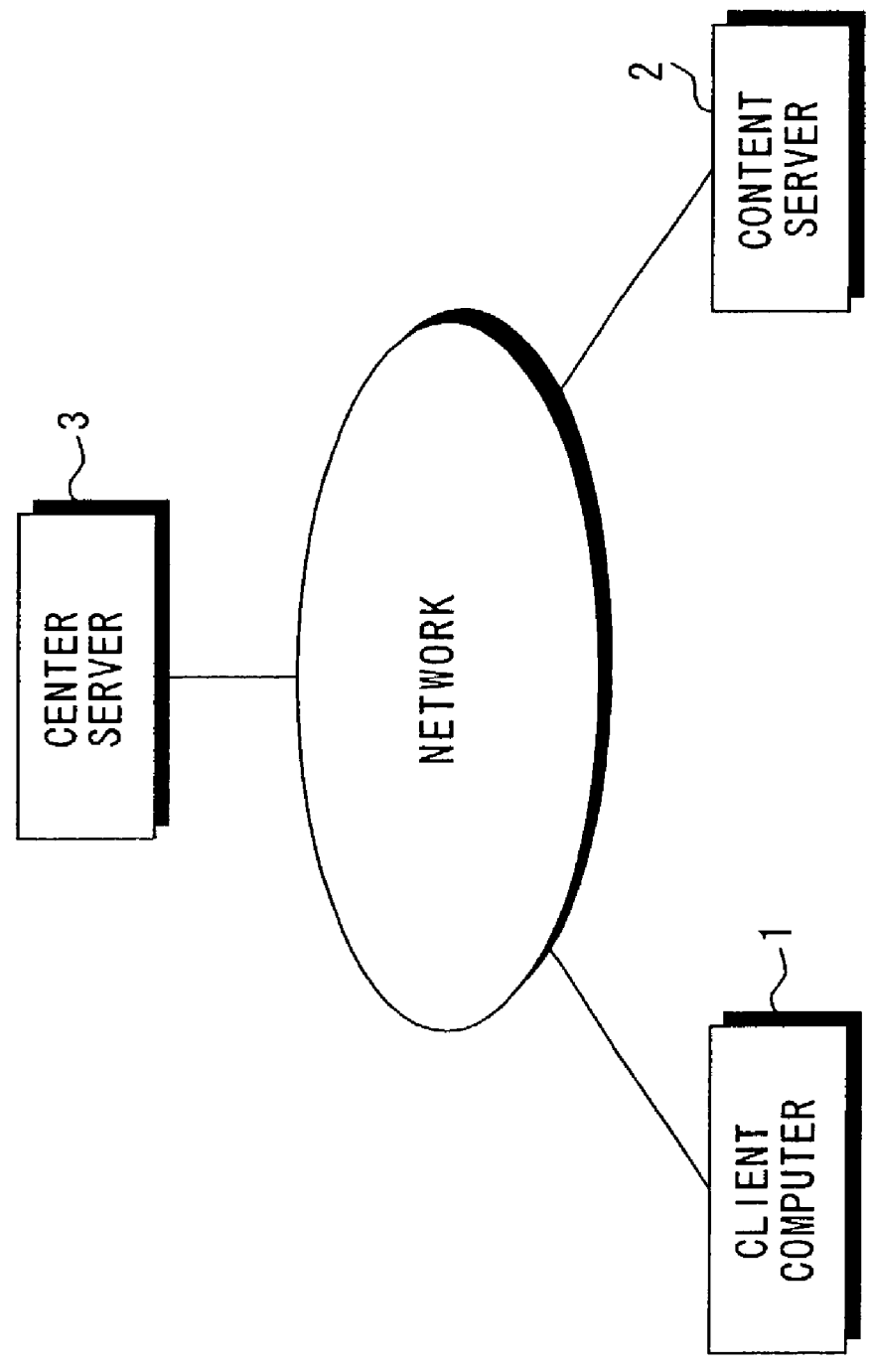
FIG. 1 is a block diagram illustrating the electrical configuration of a digital content system.

FIG. 1 illustrates an overview of a digital content system according to a preferred embodiment of the invention.

The digital content system shown in FIG. 1 comprises a client computer 1, a content server 2 and a center server 3 that are capable of communicating with one another via a network such as the Internet. A number of items of digital content have been stored at the content server 2.

The digital content system according to this embodiment is such that the client computer 1, which is authorized, is allowed to be informed of the IP (Internet Protocol) address of the content server 2. Whether a computer is the authorized client computer 1 is verified by both the center server 3 and content server 2. Verification may be performed solely by the center server 3, however.

Though only one client computer 1 and one content server 2 are shown in FIG. 1, it goes without saying that a number of client computers 1 and a number of content servers 2 would be connected to the network. There may also be a number of the center servers 3.

Figure 2:
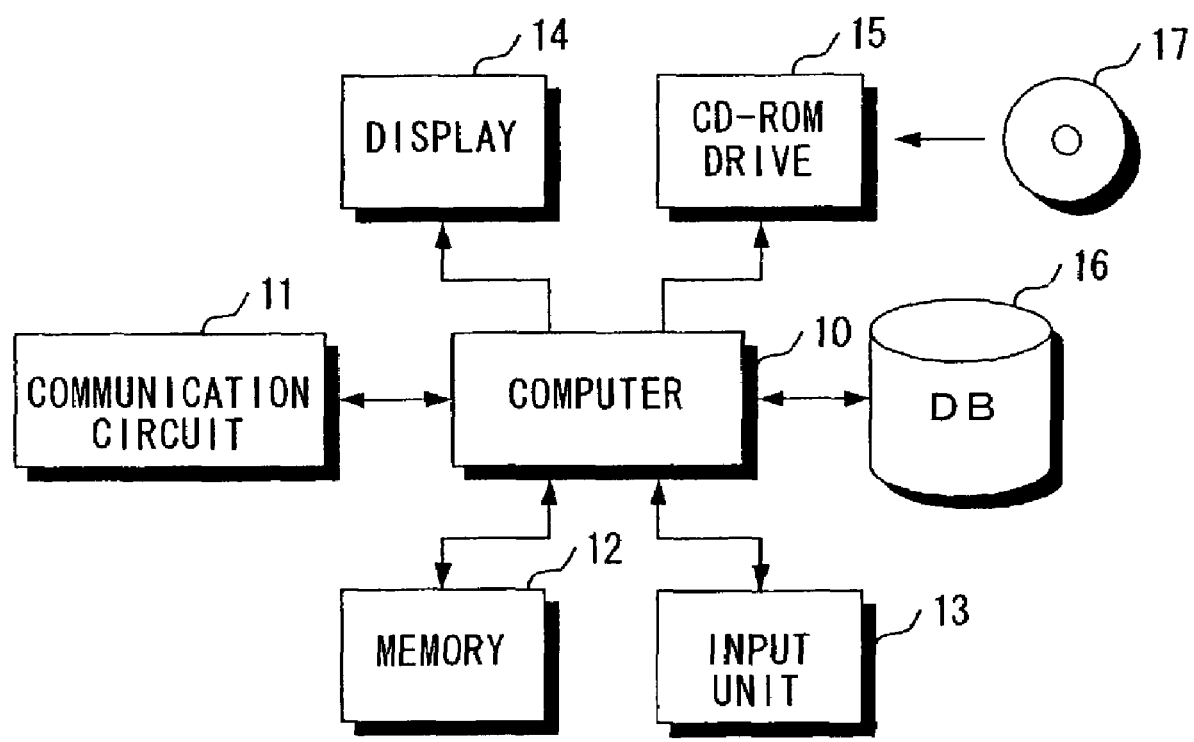
FIG. 2 is a block diagram illustrating the electrical structure of a content server.

FIG. 2 is a block diagram illustrating the electrical structure of the content server 2. The client computer 1 and center server 3 have a structure that is similar to that of the content server 2.

The overall operation of the content server 2 is controlled by a computer 10. The computer 10 includes a communication circuit 11 for implementing communication of data with the client computer 1 and center server 3, a memory 12 for storing data and the like temporarily, an input unit 13 for applying commands and the like to the computer 10, a display unit 14 and a database 16 for storing digital content.

The content server 2 further includes a CD-ROM (compact disk—read-only memory) drive 15. A CD-ROM 17, which stores a program for carrying out an operation described later, is accessed by the CD-ROM drive 15. The program read from the CD-ROM 17 is installed on the computer 10.

In this embodiment, use is made of encryption based upon a public key system (though it goes without saying that a private key system may be utilized). The public key has been stored in the memory 12 of content server 2. Further, a secret key corresponding to the public key has been stored in center server 3. Data that has been encrypted by the public key is decrypted by the secret key.

Figure 3:
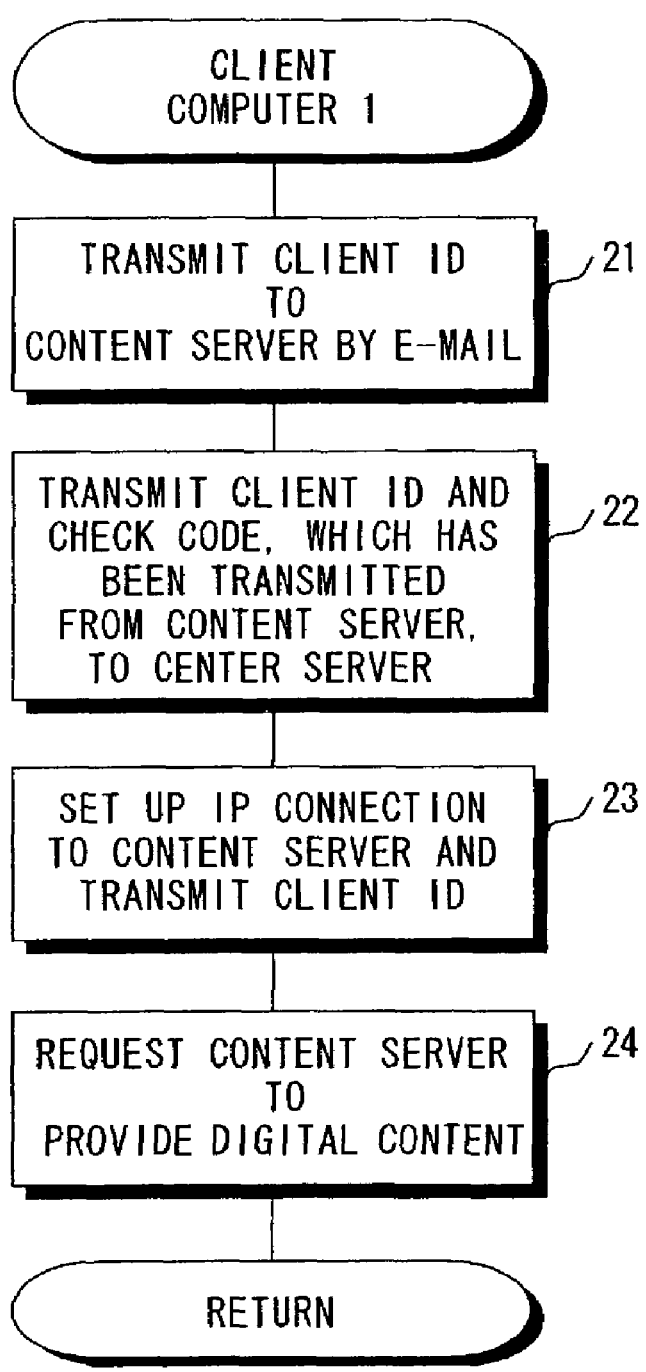
FIG. 3 is a flowchart illustrating processing executed by a client computer.
Figure 4:
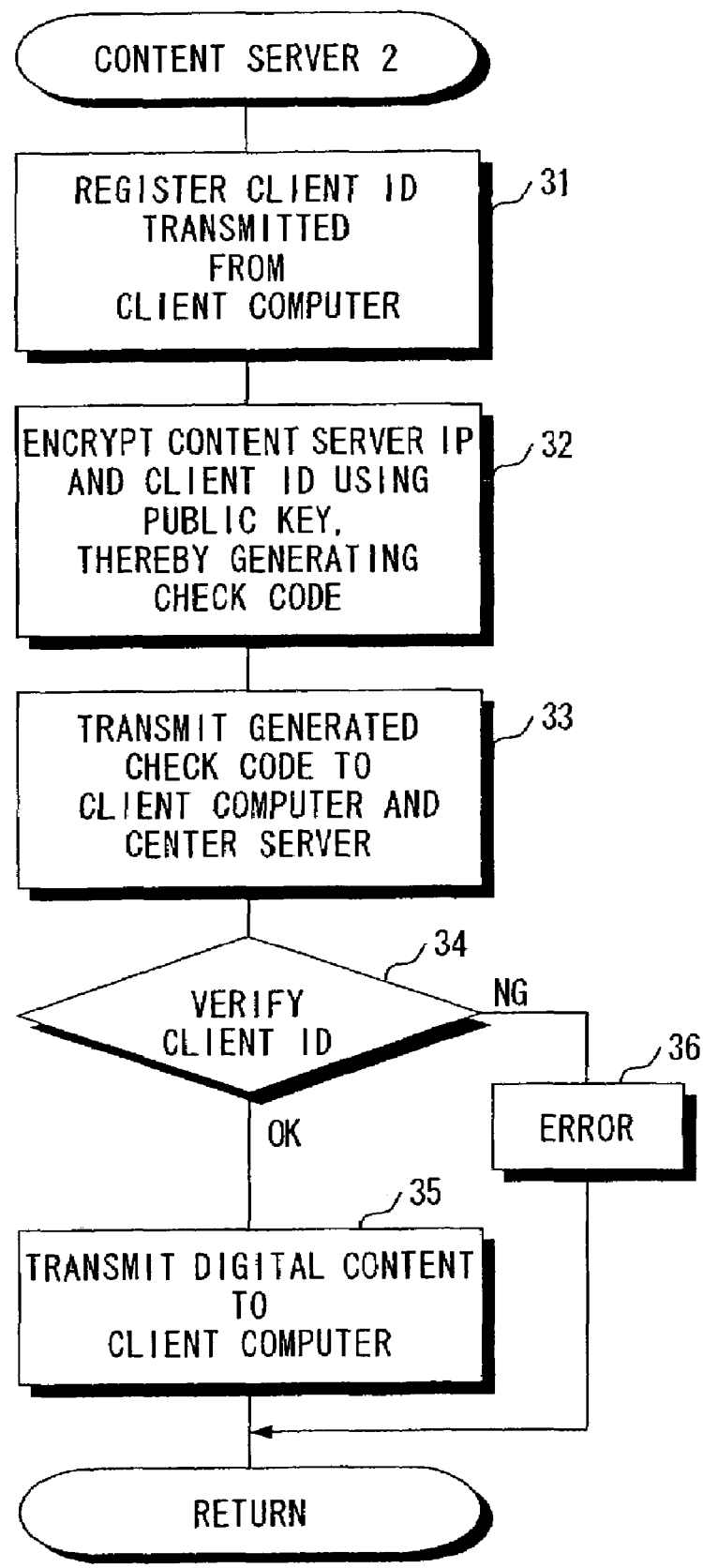
FIG. 4 is a flowchart illustrating processing executed by the content server.
Figure 5:
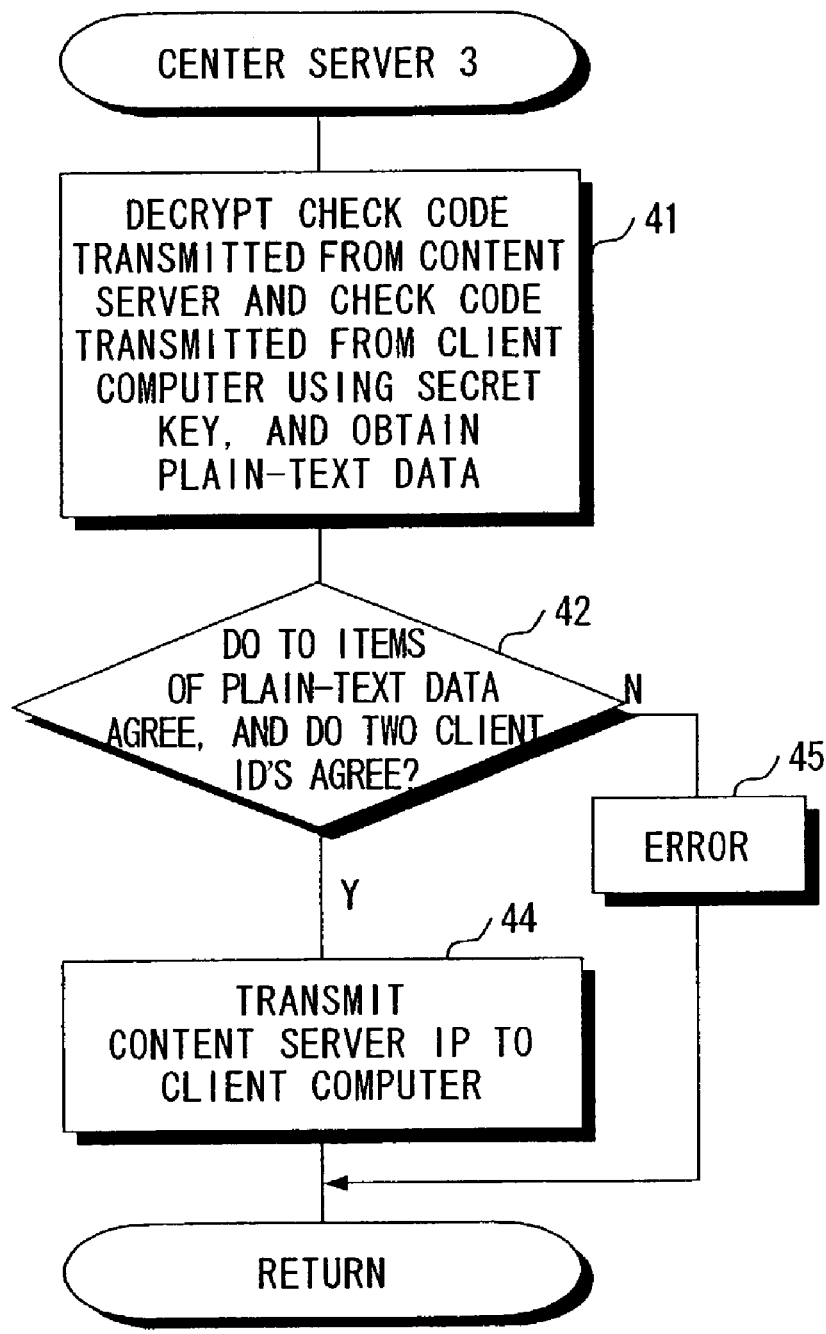
FIG. 5 is a flowchart illustrating processing executed by a center server.

FIGS. 3 to 5 are flowcharts illustrating processing executed by the digital content system of the invention. FIG. 3 is a flowchart of processing executed by the client computer 1, FIG. 4 is a flowchart of processing executed by the content server 2, and FIG. 5 is a flowchart of processing executed by the center server 3.

It will be assumed that the user of the client computer 1 knows the E-mail address of the operator of center server 3. Further, it will be assumed that the user of the client computer 1 has been informed, as by the operator of the content server 2, of the kind of digital content available at the content server 2.

The client computer 1 transmits its ID, which is specific to the client computer 1, to the content server 2 by E-mail (step 21 in FIG. 3).

Upon receiving the ID transmitted from the client computer 1 by E-mail, the content server 2 registers the received ID (step 31 in FIG. 4). When this is accomplished, the content server 2 encrypts its IP address and the ID of the client computer 1 using the public key corresponding to the secret key that has been stored in the center server 3 (step 32 in FIG. 4). The data obtained by encrypting the IP address and the ID of the client computer 1 shall be referred to as a "check code". The check code thus generated is transmitted to both the client computer 1 and center server 3 (step 33 in FIG. 4).

When the check code is transmitted to the client computer 1, the ID of the client computer 1 and this check code are transmitted from the client computer 1 to the center server 3 (step 22 in FIG. 3).

Upon receiving the check code transmitted from the content server 2 as well as the check code and client computer ID transmitted from the client computer 1, the center server 3 decrypts the check code using the secret key (step 41 in FIG. 5). Plain-text data indicating the IP address of the content server 2 and plain-text data indicating the ID of the client computer 1 is obtained by decryption.

The center server 3 checks to determine whether plain-text data obtained from the check code transmitted from the content server 2 agrees with the plain-text data obtained from the check code transmitted from the client computer 1, and whether the client ID obtained from the plain-text data agrees with the client ID transmitted from the client computer 1 (step 42 in FIG. 5). If the two items of plain-text data agree and the two client IDs agree, then the center server 3 decides that the client computer 1 that transmitted the check code and client ID to the center server 3 has the right to access the content server 2 ("YES" at step 42). As a result, the IP address of the content server 2, which is for allowing the client computer 1 to gain IP access to the content server 2, is transmitted from the center server 3 to the client computer 1 (step 44 in FIG. 5). If the two items of plain-text data do not agree and/or the two client IDs do not agree ("NO" at step 42 in FIG. 5), the center server 3 executes predetermined error processing (step 45 in FIG. 5).

Upon receiving the IP address of the content server 2 transmitted from the center server 3, the client computer 1 sets up the IP connection to the content server 2 (step 23 in FIG. 3). When the IP connection has been set up, the client computer 1 transmits its ID to the content server 2. Of course, it may be so arranged that when the IP connection to the content server 2 is set up, the ID of the client computer 1 is transmitted at the same time. Further, the client computer 1 requests the content server 2 for digital content (step 24 in FIG. 3).

The content server 2 checks to determine whether the ID of the client computer 1 transmitted from the client computer 1 agrees with the already registered ID of client computer 1 (the ID registered by the processing of step 31 in FIG. 4) (step 34 in FIG. 4). If the two IDs agree ("OK" at step 34 in FIG. 4), then the content server 2 decides that the client computer 1 that is accessing the content server 2 is the authorized client computer 1. In response to the request from the client computer 1, digital content that has been stored is transmitted from the content server 2 to the client computer 1 (step 35 in FIG. 4). The digital content also may be encrypted. In such case the client computer 1 would execute decryption processing.

The digital content that has been stored in the content server 2 is thus acquired by client computer 1.

If the content server 2 finds that the two compared IDs do not agree ("NO" at step 34), then the content server 2 executes predetermined error processing (step 36 in FIG. 4).

In the above-described embodiment, the specific client computer 1 obtains digital content that has been stored in the content server 2. However, it can be so arranged that a specific content server is allowed to print out digital content.

As many apparently widely different embodiments of the present invention can be made without departing from the spirit and scope thereof, it is to be understood that the invention is not limited to the specific embodiments thereof except as defined in the appended claims.

What is claimed is:

1. A digital content system comprising a client computer, a content server with which an ID of said client computer is registered, and a center server, wherein said content server includes:

a first transmitting device for transmitting the ID of said client computer and encrypted address data indicating the address of said content server to said center server; and a second transmitting device for transmitting the encrypted address data to said client computer;

said client computer includes a third transmitting device for transmitting the ID of said client computer and the encrypted address data, which has been transmitted from said second transmitting device of said content server, to said center server; and said center server includes:

a first decrypting device for decrypting the encrypted address data that has been transmitted from said first transmitting device of said content server;

a second decrypting device for decrypting the address data that has been transmitted from said third transmitting device of said client computer;

a first determination device for determining whether the address data that has been decrypted by said first decrypting device and the address data that has been decrypted by said second decrypting device agree;

a second determination device for determining whether the ID of said client computer that has been transmitted from said first transmitting device of the content server and ID of the client computer that has been transmitted from said third transmitting device of said client computer agree; and a fourth transmitting device for transmitting the address data that has been decrypted by at least one of said first and second decrypting devices to said client computer in response to a determination by both of said first and second determination devices that agreement has been obtained.

2. The system according to claim 1, wherein said client computer further includes a fifth transmitting device for transmitting the ID of said client computer to said content server; and said content server further includes;

a third determination device for determining whether the ID of said client computer transmitted from said fifth transmitting device of said client computer and the ID of said client computer registered agree; and a sixth transmitting device for transmitting digital content to said client computer in response to a determination by said third determination device that the two IDs agree.

* * * * *